United States Patent [19]

Peterson et al.

[11] Patent Number: 5,609,342

[45] Date of Patent: Mar. 11, 1997

[54] GAS SHAFT SEAL WITH FLEXIBLE CONVERGING SEALING FACES

[75] Inventors: Robert A. Peterson; Robert S. Evenson; Clayton Bear, all of Calgary, Canada

[73] Assignee: Revolve Technologies, Inc., Calgary, Canada

[21] Appl. No.: 273,357

[22] Filed: Jul. 11, 1994

[51] Int. Cl.$^6$ .................................................. F16J 15/34
[52] U.S. Cl. ............................ 277/81 R; 277/96; 277/26
[58] Field of Search ...................................... 277/26, 81 R, 277/95, 96, 96.1, 96.2

[56] References Cited

U.S. PATENT DOCUMENTS

| | | | |
|---|---|---|---|
| 3,499,653 | 3/1970 | Gardner | 277/96.1 |
| 4,415,168 | 11/1983 | Takenaka et al. | 277/96.1 |
| 4,418,921 | 12/1983 | Wiese et al. | 277/96.1 |
| 4,426,092 | 1/1984 | Wiese | 277/96.1 |
| 4,659,092 | 4/1987 | Wallace et al. | 277/81 R |
| 4,792,146 | 12/1988 | Lebeck et al. | 277/26 |
| 4,900,039 | 2/1990 | Klecker et al. | 277/81 R |
| 4,907,512 | 3/1990 | Trytek | 277/96.1 |
| 5,058,905 | 10/1991 | Nosowicz et al. | 277/81 R |
| 5,135,235 | 8/1992 | Parmar | 277/26 |
| 5,385,409 | 1/1995 | Ide | 277/81 R |

OTHER PUBLICATIONS

"Engineered Fluid Sealing", John Crane Packing Company; Sep. 1981; pp. 91, 119–121, 191–195, 260–261.
R. Metcalfe, N. E. Pothier, and B. H. Rod; "Diametral Tilt and Leakage of End Face Seals With Convergent Sealing Gaps"; Sep. 1978; (entire paper).
E. Mayer; "Mechanical Seals", 2nd ed.; Apr. 1973; pp. 42–63, 84–87, 95–109.

*Primary Examiner*—Scott Cummings
*Attorney, Agent, or Firm*—Bruce E. Harang

[57] ABSTRACT

This invention relates to a lubricating film type gas seal having a stationary sealing ring (stator) with a radially extending sealing face and a rotating mating seal component (mating rotor) with a radially extending sealing face. The present seal has a reduced number of components and is greatly simplified from working seals described in prior art. The mating rotor is deliberately flexible, and hence it may distort (tilt) throughout an angular range during hydrostatic and hydrodynamic operation and is dependent on rotational speed, pressure, temperature and is also a function of its material and geometric properties. The stationary ring sealing face complies to and follows the angular distortion (tilting) of the mating rotor sealing face in a converging or diverging manner throughout the hydrostatic and hydrodynamic operational range. The flexibility of the stator is a function of its geometric and material properties. Mating rotor and stator flexibility is preferably matched (e.g. using Finite Element Analysis (FEA) techniques) to provide a system flexibility which produces optimum sealing performance. The mating rotor may possess multiple radial sealing surfaces as well as one or more cylindrical sealing surfaces. Initial mating rotor and/or stator seal face angular deflection may be introduced by applying stress and producing subsequent deformation of the structure by a mechanical means.

1 Claim, 6 Drawing Sheets

FIGURE 6A, EXAMPLE I

GAS SHAFT SEAL WITH FLEXIBLE CONVERGING SEALING FACES

FIELD OF THE INVENTION

The present invention relates to lubricating film type gas seals for rotating equipment.

BACKGROUND OF THE INVENTION

Prior to this invention, gas seals have commonly utilized stationary and rotating rings of simple ring type geometry which maintain a lubricating film (gap) between their respective sealing faces by means of hydrodynamic fluid forces. The terms hydrodynamic and hydrostatic as used herein are meant to convey their conventional meanings (as discussed, for example, at page 661 of Principles and Design of Mechanical Face Seals, Lebeck, A., 1991; ISBN 0-471-51533-7). The stationary sealing ring (stator) is generally disposed in the sealing housing and the rotating sealing ring (mating ring) is generally disposed on and fixed to the shaft. Geometric symmetry of the mating ring and application of pressure balancing techniques about the mating ring, in the prior art, ensures the mating ring sealing face remains perpendicular to the axis of the shaft and parallel to the stationary sealing face throughout all operating conditions. Prior theoretical art shows that a slightly converging gap (converging coning angle) between the adjacent sealing faces is a fundamental requirement for stable seal operation. A slightly diverging gap between seal faces (diverging coning angle) causes hydrostatic and hydrodynamic fluid instability and destruction of the sealing faces due to touchdown and rubbing. A diverging gap is defined as where the axial distance between sealing face surfaces is smallest at the high pressure diameter. Prior disclosures by Wiese (U.S. Pat. No. 3,628,799) and Gardner (U.S. Pat. No. 3,804,424) infer that sealing face distortion must be minimized or neutralized for successful operation of the sealing devices disclosed. For example, in U.S. Pat. No. 4,212,475 (Sedy) it is stated that the inventor believes that seal failures may arise, in part, from the inability to maintain sufficiently parallel alignment of the non-contacting faces. Sedy then describes a seal with a non-distorting mating ring as well as a stationary ring (stator) with momentary or transient self alignment features based on generating interfacial hydrodynamic pressures in excess of pressures sealed. Those skilled in the art will realize that distortion of the mating ring during operation is prevented by utilizing a geometrically symmetrical mating ring and by balancing the pressure forces about the mating ring. Mating ring symmetry shown by Sedy is believed to result in the sealing face remaining essentially perpendicular to the axis of the shaft when the ring is subjected to centrifugal force due to rotation. A non-symmetrical mating rotor would cause the sealing face to tilt in a diverging or converging manner as speed is varied, resulting in changing stable and/or unstable operating characteristics throughout the seals operating range. The two o-rings shown by Sedy at the rear face and inside diameter of the mating ring provide a flexible mount to presumably enhance mating ring dynamic stability as well as seal the process fluid. Mating ring distortion is further prevented by a pressure balancing feature provided by the o-ring shown at the rear face of the mating ring. Although the function of this o-ring is not described by Sedy, its purpose is presumably to preclude the loss of fluid through the rear of the seal. Those skilled in the art will realize that the position of this o-ring at the rear of the mating ring also substantially prevents a diverging tilt, and unstable operation, of the mating ring when subjected to hydrostatic pressure. Symmetrical mating ring geometry and the rear o-ring position provide mating ring balancing features necessary to ensure stable seal operation in seals described in prior art. Stationary seal rings are generally not intended to compensate for gross mating ring tilt or excursions that would occur without implementation of these mating ring seal face alignment features. However, as noted above, numerous components are required in such prior art seals so as to reduce the tendency for the mating ring to tilt. This is disadvantageous because the use of such numerous components greatly increases the cost and operating complexity of the seal.

Accordingly, it is one object of this invention to reduce the number of components in the seal by utilizing a deliberately flexible mating rotor and a deliberately flexible stator.

SUMMARY OF THE INVENTION

In one embodiment, the present invention provides:

In a dry gas seal having a rotor and a stator, wherein said dry gas seal is operable with a machine having a rotating shaft, the improvement consisting of:
  a) a flexible rotor which:
    1) has a radially extending sealing face, and
    2) is sealingly affixed to said shaft, wherein said rotor is characterized by being deliberately flexible; and
  b) a flexible stator having a radially extending sealing face, wherein said stator is characterized by being deliberately flexible, such that, under hydrostatic conditions said rotor and said stator cooperate so as to provide a seal and such that, under stable hydrodynamic conditions, said flexible stator cooperates with said flexible rotor so as to provide a seal having a converging coning angle.

As previously noted, it is one object of this invention to reduce the number of components in the seal. In a preferred embodiment, the mating rotor is an integral piece which consolidates the following components of the seal in U.S. Pat. No. 4,212,475: mating ring, drive sleeve with radially extending flange, spacer sleeve, multiple drive pins and o-ring at the inner diameter of the mating ring. In addition, the present seal allows the removal of the pressure balance o-ring (which is located behind the mating ring of prior seals). This is a significant improvement as it eliminates seal failure due to explosive decompression of the o-ring. Another significant benefit of the seal of this invention is that it allows the elimination of drive pins and drive pin holes in the mating ring. This prevents stress induced mating ring failure due to the stress concentration caused by these pins and holes. Manufacturing cost is also reduced by the reduction of the number of components.

It will be appreciated that the lack of pressure balancing and seal face rotational alignment features allow the mating rotor of the seal of this invention to tilt significantly throughout its operating range. The amount of tilt of the mating rotor depends on the geometry, material, and operating environment (i.e. pressure, speed, temperature). This is accommodated by matching the flexibility of the stator with the mating rotor such that the flexible rotor and the flexible stator cooperate with one and other so as to provide a seal having a converging coning angle. As used herein, the term coning angle refers to the angle formed by the mating sealing faces of the rotor and the stator. The coning angle is deemed to be converging if the gap between the sealing faces is smallest at the low pressure diameter of the seal.

BRIEF DESCRIPTION OF THE DRAWINGS

Further details relating to the preferred embodiments of the invention are discussed with reference to the following non-limiting drawings, in which:

FIG. 6A shows a cross section of a mating rotor according to this invention for example I.

DETAILED DESCRIPTION OF PREFERRED EMBODIMENTS

Figure 1:
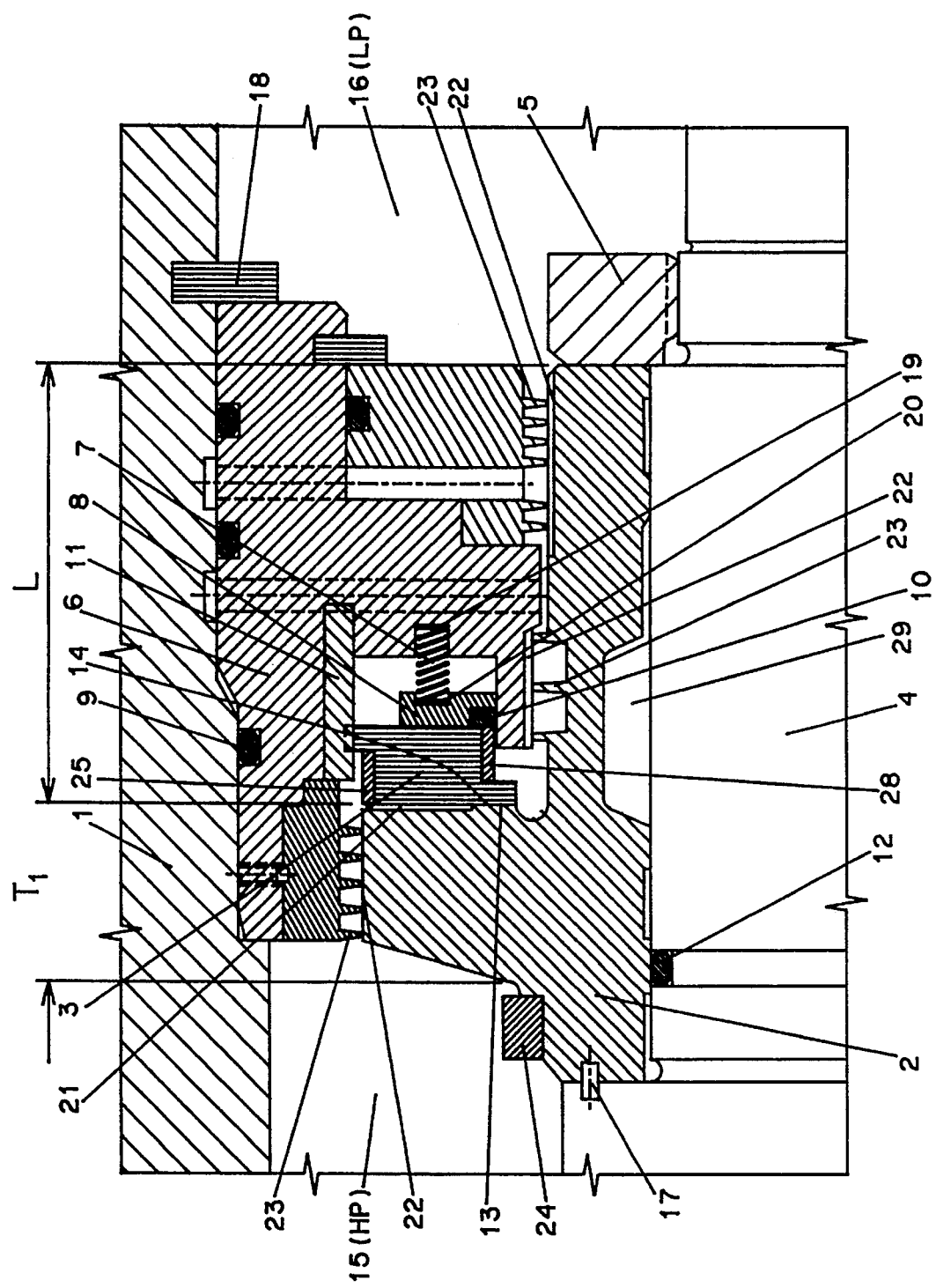
FIG. 1 shows a cross-section of a gas seal according to the invention.

A preferred embodiment of the invention is depicted in FIG. 1. A rotating shaft 4 extends through compressor housing 1. The seal of this invention seals high pressure process fluid in chamber 15 from leaking to lower pressure chamber 16 (e.g. atmosphere). The mating rotor 2 is fixed to the shaft 4 with retaining nut 5 and rotation is prevented by drive pin 17. O-ring 12 prevents leakage between shaft 4 and mating rotor 2. Thus the mating rotor 2 is sealingly affixed to the shaft 4. Stator housing 6 is located in compressor housing 1 by retaining device 18. Process fluid is sealed between the respective housings by o-ring 9. Stator 3 is located in stator housing and prevented from rotating by anti-rotation device 11. The radially extending stator sealing face 14 is forced to axially contact radially extending mating rotor sealing face 13 by compression of a plurality of helical springs 7 mounted in stator housing spring recess 19 and retaining disk recess 20. Retaining disk 8 is axially forced against stator and locates sealing o-ring 10. Shallow, preferably spiral, grooves 21 are located on the mating rotor. As will be appreciated, the grooves may be alternatively located on the stator. In addition, grooves can be designed according to well known principles and hence may vary in shape, size and depth depending on application.

The mating rotor is preferably manufactured from a ductile ferrous or non-ferrous material and preferably possesses a minimum Modulus of Elasticity of approximately 10,000,000 pounds per inch squared.

A suitable material for the stator would be carbon graphite but other materials that possess a low coefficient of friction and preferably possess a minimum Modulus of Elasticity of approximately 1,800,000 pounds per inch squared may also be utilized.

The mating rotor can be mechanically deformed by shrink fitting a circumferential ring 24 to the mating rotor. This allows the mating rotor seal face to tilt in a preferred direction to enhance seal performance. A deformable slot (e.g. a circumferential groove) 29 can be introduced to the mating rotor to adjust (tune) mating rotor flexibility if required to ensure seal face deflection remains within limits. Circumferential rings 25 and 28 can be shrink fitted to the stator to deform the stator and/or enhance the performance of the stator.

The mating rotor 2 may also possess one or more annular cylindrical sealing surfaces 22 which mate to an opposite sealing surface 23. The cylindrical sealing surface may be smooth or possess a labyrinth or other complex geometry to mate with an opposing cylindrical sealing surface.

Figure 2:
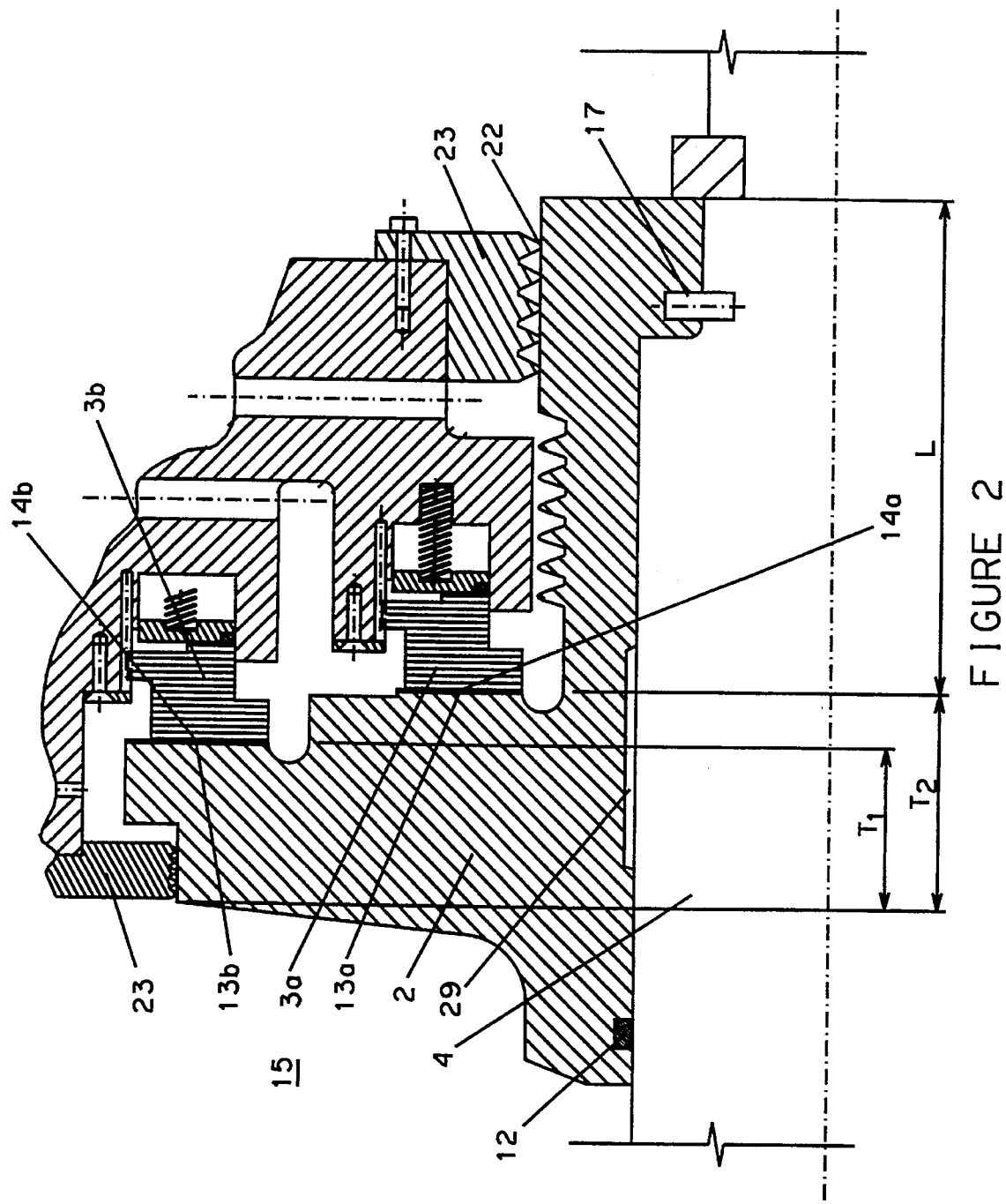
FIG. 2 shows a cross-section of seal of this invention with multiple radial and annular sealing surfaces located on the mating rotor at different radial locations.

In another embodiment, as shown in FIG. 2, a dry gas seal may be further characterized in that the mating rotor has a first radially extending sealing face 13a and a second radially extending sealing face 13b, wherein the second radially extending sealing face is located at a greater radial distance from the axis of rotation of said rotating shaft in comparison to first radially extending sealing face. The thickness, $T_1$ and $T_2$, of the rotor at the seal face may be different for each seal face as shown in FIG. 2. A dry gas seal with this configuration is useful for applying an axial load to the shaft.

Figure 3:
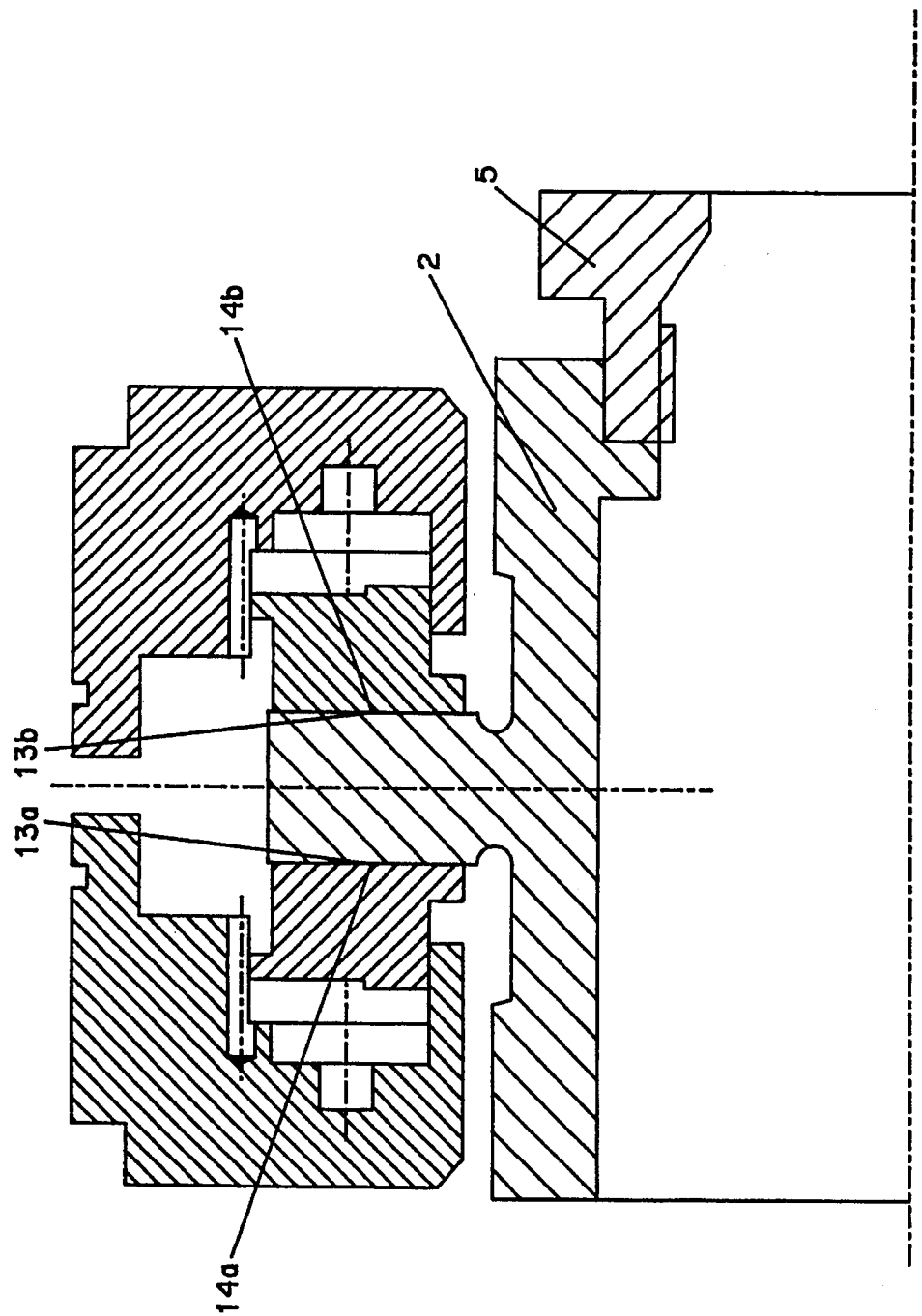
FIG. 3 shows a cross-section of seal of specific embodiment of the invention in which multiple radial and annular sealing surfaces are located on the mating rotor in a back to back configuration.

In another embodiment, as shown in FIG. 3, a dry gas seal may be characterized in that the flexible mating rotor has a first radially extending sealing face 13a and a second radially extending sealing face 13b, wherein the first radially extending sealing face, 13a, is located at a different axial position, 13b, with respect to the length of the rotating shaft in comparison to the axial position of the second radially extending sealing face 13b. This configuration adds redundancy to the seal and may improve reliability and safety.

Figure 4:
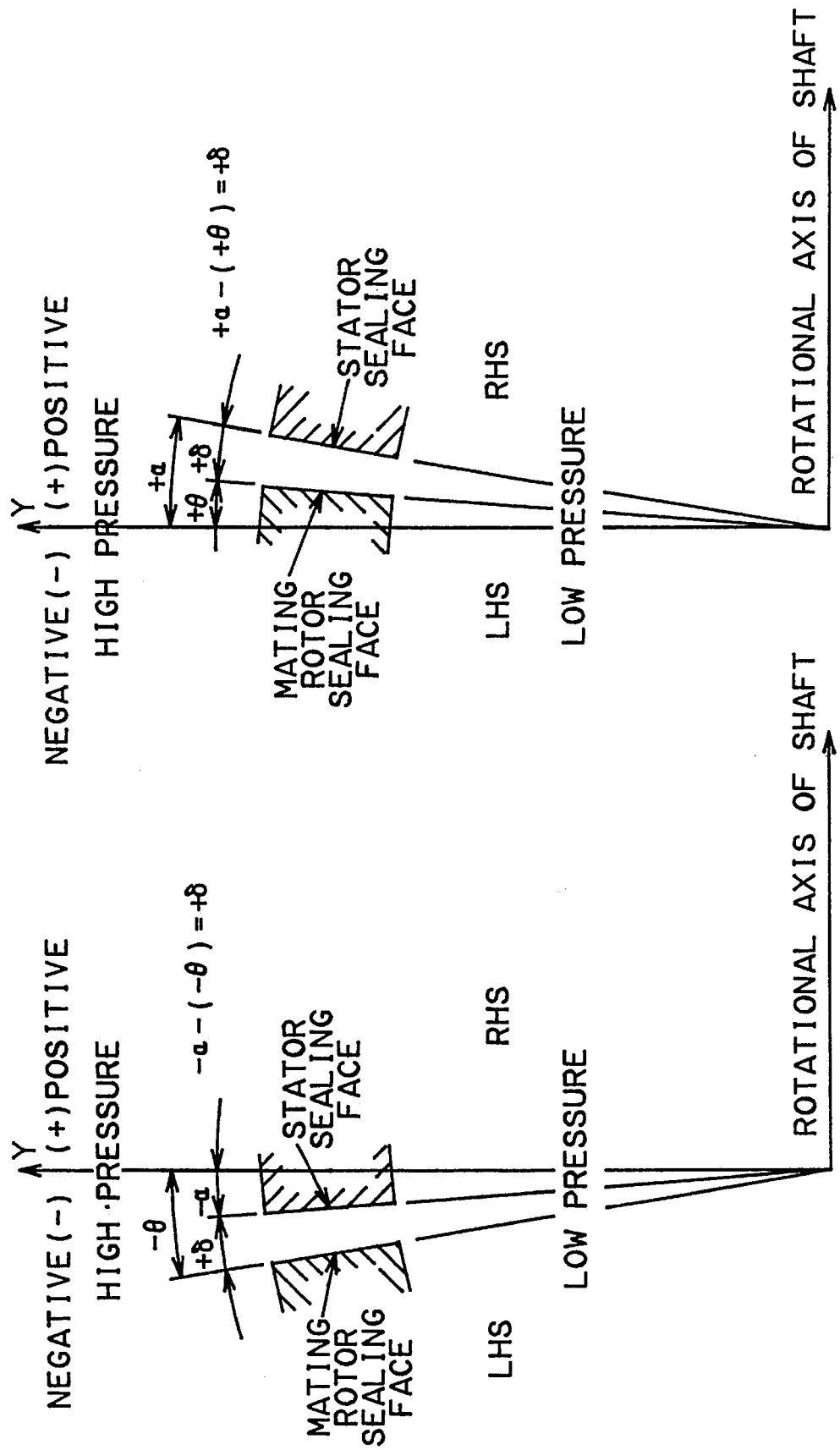
FIG. 4 shows a schematic describing mating rotor and stator angular deformation and resulting coning angle.
Figure 5A:
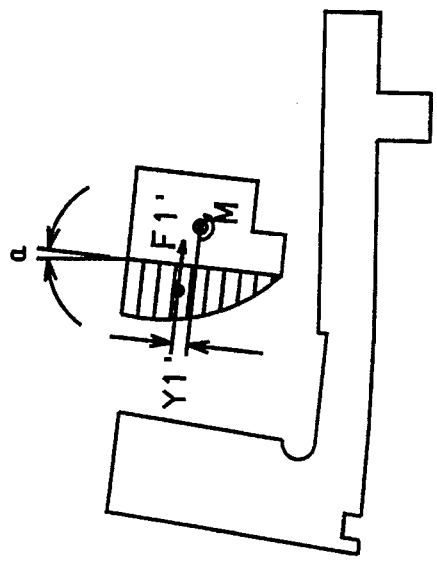
FIGS. 5A–5D show hydrostatic pressure profiles across seal face with various coning angle configurations.
Figure 5B:
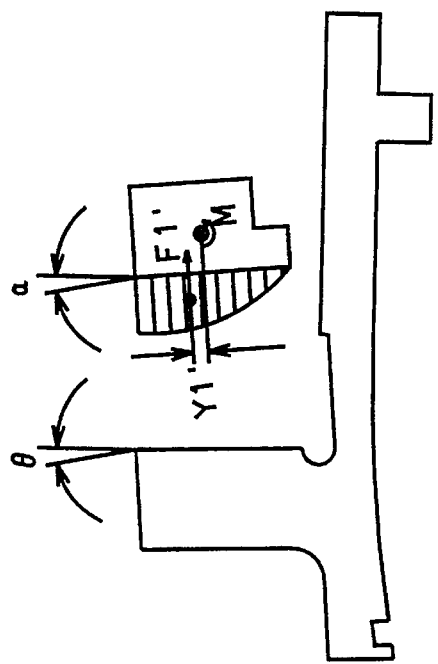
Figure 5C:
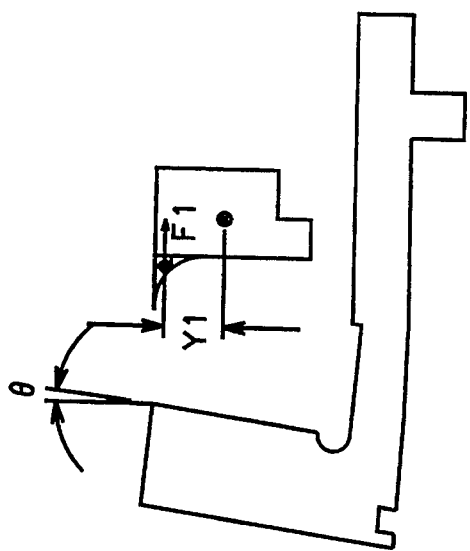
Figure 5D:
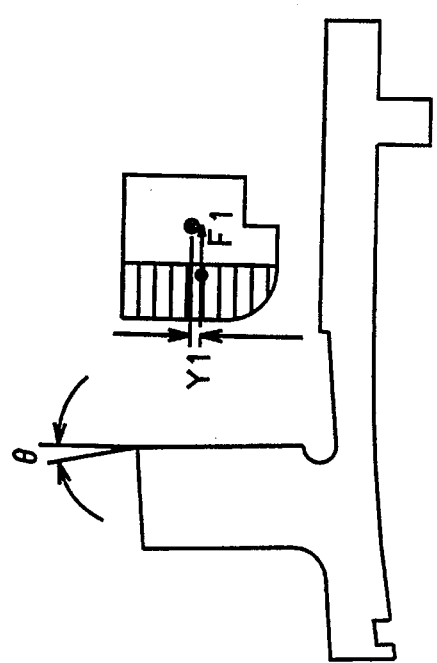

It is preferred that both sealing faces 13 and 14 are flat to within 10 helium light bands (116 micro inches); and substantially parallel; and are essentially perpendicular to the shaft axis within 0.002 inches when not subjected to pressure or rotation. When subjected to pressure or rotation, the mating rotor sealing face can deflect from an initial flat plane surface (perpendicular to the axis of the shaft) to a tilting, conical surface. The mating rotor seal face 13 may deflect up to approximately 0.400 degrees in the converging direction and up to approximately 0.200 degrees in the diverging direction due to pressure imbalance and rotational forces. Mating rotor seal face tilt (coning) is described by angle, $\theta$, and stator seal face tilt (coning) is described by angle, $\alpha$, in FIG. 4. The sign for angles $\theta$ and $\alpha$ is defined according to the following convention:

a) each angle is measured from a reference plane which extends radially from said shaft at a perpendicular angle to the axis of rotation of said shaft;

b) from the defined perspective in which, in a cross sectional view of said seal, said rotor is located on the left hand side of said reference plane and said stator is located on the right hand side of said reference plane; and c) from the defined perspective recited in said b) above, said positive angle is measured clockwise from said reference plane and said negative angle is measured counter-clockwise from said reference plane.

It will be appreciated that the sign of the angle (i.e. whether the angle is positive or negative) is a function of the convention that is used. Thus, a different convention may describe the same physical result in a different manner (for example, if the rotor is moved from the left hand side to .the right hand side of the plane, then a 'positive' angle is defined according to the convention otherwise set out in a) to c) above would become 'negative').

The gap between the mating rotor and stator seal faces is deemed to be converging if the gap is smallest at the low pressure diameter of the seal. The coning angle, γ, is equal to the stator seal face tilt, α, minus mating rotor seal face tilt, θ. A converging gap is characterized by a positive coning angle, γ, while a diverging gap is characterized by a negative coning angle, γ.

Using conventional Finite Element Analysis (FEA) techniques it is possible to design and match the flexible mating rotor and stator such that under hydrostatic and/or hydrodynamic conditions said rotor and said stator cooperate so as to provide a stable seal having a converging coning angle, γ. Conventional Finite Element Analysis techniques have been described to be accurate to theoretical benchmarks to within one percent error [reference: ANSYS Engineering Analysis System Verification Manual, Ed. Feb. 1990] when used by a person skilled in the art. Prior theoretical art shows that the hydrostatic and hydrodynamic pressure profiles between the sealing faces is dependent on coning angle γ. A negative γ (diverging coning angle) typically results in seal leakage flow instability. Positive γ (converging coning angle) results in a stable leakage flow. Stator tilt, α, may be produced by unbalanced hydrostatic and hydrodynamic pressure forces about the centroid of the stator and by thermal gradients. For minimum seal wear, a converging coning angle, γ, must occur for both hydrostatic and hydrodynamic operation. For a hydrostatic seal, the pressure must be maintained at a level that will allow the stator to follow the tilt of the rotating mating rotor so as to provide a seal having a converging coning angle.

FIGS. 5A–5D show a hydrostatic seal pressure profile variation and following action of the stator for typical seal configurations. When the mating rotor sealing face is initially tilted in a diverging coning manner due to hydrostatic pressure, the flow is restricted (zero or low flow). The hydrostatic pressure distribution around the stator causes the stator to flex about its centroid. When the hydrostatic pressure reaches a level that causes the stator to tilt to the extent that a converging coning angle is formed, stable flow and seal operation will result. Some tilting effect is also produced on the mating rotor but to much less degree due to its greater stiffness. When the mating rotor sealing face is initially tilted in a converging coning manner, the flow and leakage become large. Higher hydrostatic pressures cause the pressure distribution about the stator centroid to form a smaller coning angle, γ, and reduce the leakage flow. Once the seal is pressurized, speed and temperature variations cause changes to θ and α which are compensated for by a change in pressure profile which results in a new equilibrium configuration and coning angle. In a seal that may operate without sufficient hydrostatic pressure, sufficient hydrodynamic pressure must be produced by shallow grooves etched into the sealing face to cause the stator to lift off and form a converging gap and generate enough hydrodynamic stiffness to prevent the stator seal face from contacting the rotating mating rotor seal face. In order to optimize the coning angle throughout the seal operating range it is preferred to match the Modulus of Elasticity (E) and Moment of Inertia (I) of the rotor and stator using an iterative design process using Finite Element Analysis. For a hydrodynamic seal, pressure profile and coning angle is dependent on groove type utilized. A non-pumping groove (e.g. a rectangular, bi-directional groove) will cause a local pressure rise with virtually no flow where as a pumping groove (e.g. uni-directional spiral grooves) will generate more pressure rise and higher leakage. Hydrodynamic effects must also be considered in matching stator and mating rotor properties and flexibility in order to optimize seal coning angle (γ) and performance.

EXAMPLE I

A similar seal to that depicted in FIG. 1 was fabricated and tested. The mating rotor used in this seal is depicted in FIG. 6a. The seal had a mating rotor seal face outside diameter of approximately 5.8 inches and a seal face inside diameter of approximately 4.3 inches. The minimum thickness of the radially extending sealing face (i.e. the thickness of the mating rotor seal face), $T_1$, was approximately 1.21 inches thick and the annulus was approximately 0.32 inches thick. The total length of the annular element (i.e. annulus length), L, was approximately 1.6 inches. The mating rotor material was stainless steel. Shallow spiral grooves were introduced into the mating rotor seal face to provide a hydrodynamic fluid flow component. The stator had similar inside and outside dimensions and was approximately 0.380 inches thick. The stator material was carbon graphite.

Finite Element Analysis techniques predicted that the seal had a maximum hydrostatic mating rotor face deflection of 0.006 degrees and a maximum hydrodynamic deflection 0.009 degrees throughout its operational range of 0 to 1200 pounds per inch squared gauge (psig) and 0 to 12000 revolutions per minute. (Note: the sign convention for the angle of deflection is as previously described in the disclosure). Under similar test conditions a maximum hydrostatic (not rotating) leakage of 0.18 standard cubic feet per minute (SCFM) and a maximum hydrodynamic (rotating) leakage of 1.28 standard cubic feet per minute were measured.

EXAMPLES II–VII

Additional seals according to this invention were subsequently manufactured and tested.

The stator used in each of these examples was the same as the stator used in Example I. The mating rotor of Examples II to IV were modified by machining away pieces of the mating rotor of Example I (i.e. the mating rotor became progressively smaller and more flexible as pieces were machined away). The mating rotor of examples V to VII were also modified by machining away pieces from another mating rotor similar to the one used in Example I. The interior lines shown in FIG. 6B which enclose the numerals II to IV indicate the pieces of the mating rotor which were successively machined away for examples II to IV respectively. Similarly, the interior lines shown in FIG. 6C indicate the pieces of the mating rotor which were successively machined away for examples V to VII. (Note: one rotor was used for examples I to IV and a different rotor was used for examples V to VII. Both rotors started with the same geometry as the rotor for example I.)

Finite Element Techniques were employed to predict the mating rotor deformation characteristics resulting from each of these modifications (as indicated in Table 1). The maximum rotor deflections predicted by FEA under hydrostatic and hydrodynamic conditions are shown in Table 1. (Note: the sign convention for the angle of deflection is as described in the disclosure).

Figure 6B:
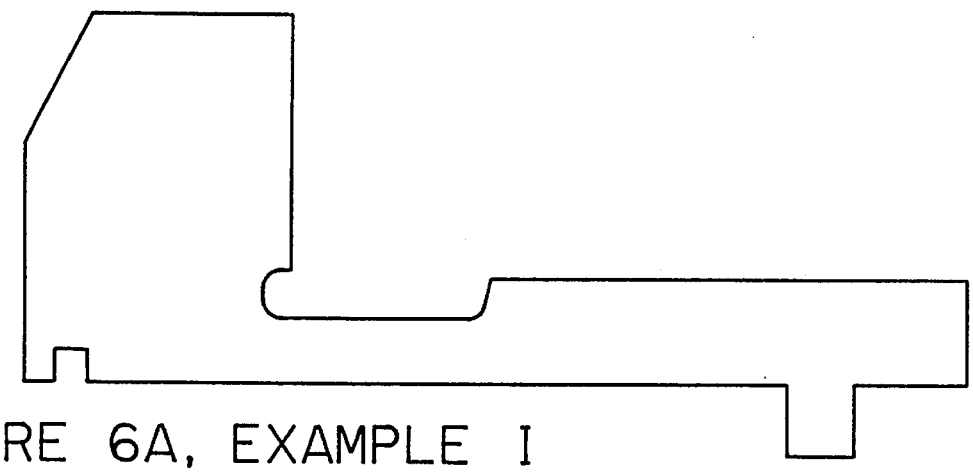
FIG. 6B shows cross sections of mating rotors with varying flexibility for examples II to IV.
Figure 6B:
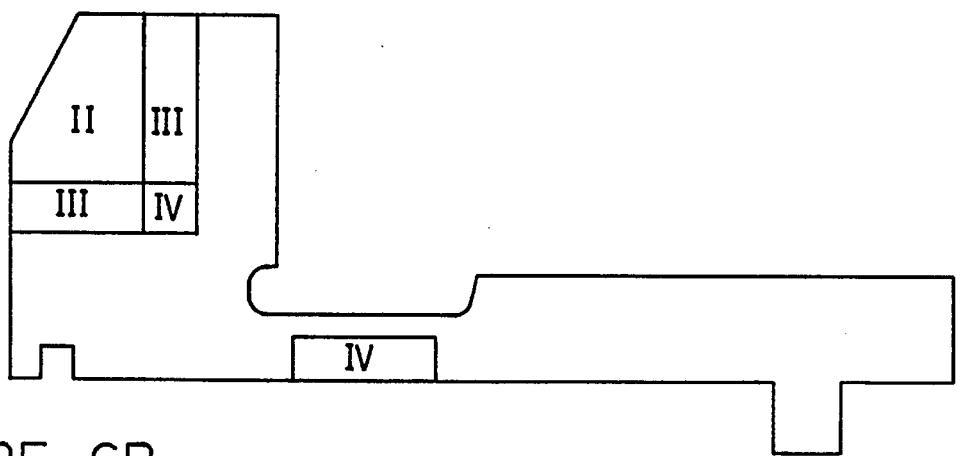
Figure 6C:
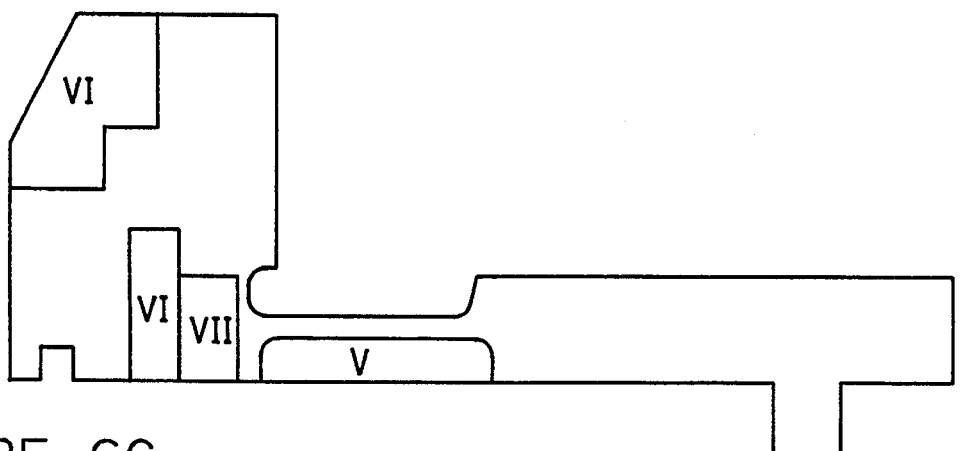
FIG. 6C shows cross sections of mating rotors with varying flexibility for examples V to VII

Seals were then assembled using the modified mating rotors shown in FIGS. 6B and 6C with the stator used in Example I. Actual leakage testing on the resulting seals was then conducted and the experimental data from these tests are shown in Table 1.

TABLE 1

| Mating Rotor Configuration (Example) | Maximum Hydrostatic Mating Rotor Deflection (degrees) | Maximum Hydrodynamic Mating Rotor Deflection (degrees) | Hydrostatic Leakage Rate (SCFM) | Hydrodynamic Leakage Rate (SCFM) |
|---|---|---|---|---|
| II  | 0.003 | −0.002 | 0.12 | 1.35 |
| III | 0.002 | −0.007 | 0.36 | 1.65 |
| IV  | 0.006 | −0.006 | 0.70 | 1.65 |
| V   | 0.009 | 0.009  | 0.60 | 1.65 |
| VI  | 0.033 | 0.027  | 0.42 | 1.85 |
| VII | 0.027 | 0.017  | 0.66 | 1.85 |

We claim:

1. In a dry gas seal having a rotor and a stator, wherein said dry gas seal is operable with a machine having a rotating shaft, the improvement comprising:

a) a flexible rotor which:
  1) has a radially extending sealing face, and
  2) is sealingly affixed to said shaft, wherein said rotor is characterized by being deliberately flexible; and b) a flexible stator having a radially extending sealing face, wherein
  said stator is characterized by being deliberately flexible, such that, under hydrostatic conditions said rotor and said stator cooperate so as to provide a seal and such that, under stable hydrodynamic conditions, said flexible stator cooperates with said flexible rotor so as to provide a seal having a converging coning angle;

further characterized by having an integrally formed annular element, wherein said annular element substantially encircles a portion of said shaft and with the further proviso that the total length of said annular element is greater than the minimum thickness of said radially extending sealing face;

still further characterized in that said flexible rotor is deflectable, under operating conditions, to a maximum angle of up to 0.4 degrees in the negative direction and to a maximum angle of up to 0.2 degrees in the positive direction, wherein each of said positive angle and said negative angle is defined according to the following convention:

a) each angle is measured from a reference plane which extends radially from said shaft at a perpendicular angle to the axis of rotation of said shaft;

b) from a defined perspective in which, in a cross sectional view of said seal, said rotor is located on the left hand side of said reference plane and said stator is located on the right hand side of said reference plane; and c) from the defined perspective recited in said b) above, said positive angle is measured clockwise from said reference plane and said negative angle is measured counter-clockwise from said reference plane.

* * * * *